US009256900B2

(12) United States Patent
Brown et al.

(10) Patent No.: US 9,256,900 B2
(45) Date of Patent: Feb. 9, 2016

(54) MANAGING SERVICE DEMAND LOAD RELATIVE TO INFRASTRUCTURE CAPACITY IN A NETWORKED COMPUTING ENVIRONMENT

(75) Inventors: Gene L. Brown, Durham, CT (US); Michael D. Brookbanks, Devon (GB); Brendan F. Coffey, Rhinebeck, NY (US); Christopher J. Dawson, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 12/946,324

(22) Filed: Nov. 15, 2010

(65) Prior Publication Data

US 2012/0123886 A1 May 17, 2012

(51) Int. Cl.
*G06Q 10/00* (2012.01)
*G06F 17/00* (2006.01)
(Continued)

(52) U.S. Cl.
CPC ............ *G06Q 30/0601* (2013.01); *G06Q 30/01* (2013.01)

(58) Field of Classification Search
CPC ................................ G06Q 10/00; G06F 17/00
USPC .................................................. 705/26.1, 400
See application file for complete search history.

(56) References Cited

U.S. PATENT DOCUMENTS

| | | | |
|---|---|---|---|
| 6,836,803 B1 * | 12/2004 | Swartz et al. | 709/227 |
| 6,996,728 B2 * | 2/2006 | Singh | 713/300 |
| 7,305,469 B2 * | 12/2007 | Leahy et al. | 709/225 |

(Continued)

FOREIGN PATENT DOCUMENTS

| | | |
|---|---|---|
| TW | 200935910 A | 8/2009 |
| TW | 200939697 A | 9/2009 |

OTHER PUBLICATIONS

"A Method and System for Virtualizing Services", Mar. 11, 2009, IP.Com, IPCOM000180513D.

(Continued)

*Primary Examiner* — Seye Iwarere
(74) *Attorney, Agent, or Firm* — Isaac J. Gooshaw

(57) ABSTRACT

Embodiments of the present invention provide an approach for implementing service level agreements (SLAs) having variable service delivery requirements and pricing in a networked (e.g. cloud) computing environment. Under embodiments of the present invention, a plurality of SLAs, each having a different price level, is made available to a consumer. The consumer may select one or more of the plurality of SLAs that reflects the consumer's service delivery requirements in a cloud computing environment. A consumer having relatively inflexible service delivery requirements may select one of the SLAs having a relatively higher price, whereas a consumer having relatively flexible service delivery requirements may select one of the SLAs having a relatively lower price. In one embodiment, the SLAs may dynamically provide for relatively lower variable pricing in response to the consumer receiving deferred or a relatively lower level of service during a peak service demand load. In another embodiment, the SLAs may dynamically provide for relatively higher variable pricing in response to consumer service requests that are fulfilled during a relatively higher overall service demand load. In yet another embodiment, the SLAs may dynamically provide for relatively lower variable pricing in response to consumer service requests that occur during a relatively lower overall service demand load.

23 Claims, 9 Drawing Sheets

(51) Int. Cl.
*G06Q 30/06* (2012.01)
*G06Q 30/00* (2012.01)

(56) References Cited

U.S. PATENT DOCUMENTS

| | | | |
|---|---|---|---|
| 7,415,435 B1* | 8/2008 | Weiss et al. | 705/37 |
| 7,463,648 B1* | 12/2008 | Eppstein et al. | 370/468 |
| 7,523,041 B2 | 4/2009 | Chen et al. | |
| 7,529,981 B2 | 5/2009 | Childress et al. | |
| 7,703,102 B1* | 4/2010 | Eppstein et al. | 718/104 |
| 7,856,497 B2 | 12/2010 | McKinnon, III et al. | |
| 7,873,564 B1* | 1/2011 | Stevens et al. | 705/37 |
| 8,321,253 B2* | 11/2012 | Mitchell et al. | 705/7.13 |
| 8,533,026 B2* | 9/2013 | Vengerov et al. | 705/7.37 |
| 2002/0069188 A1* | 6/2002 | Anvekar et al. | 705/412 |
| 2002/0087487 A1* | 7/2002 | Hassinger | 705/400 |
| 2003/0204758 A1* | 10/2003 | Singh | 713/320 |
| 2004/0064351 A1* | 4/2004 | Mikurak | 705/7 |
| 2004/0111308 A1 | 6/2004 | Yakov | |
| 2005/0038834 A1* | 2/2005 | Souder et al. | 707/203 |
| 2005/0066026 A1 | 3/2005 | Chen et al. | |
| 2005/0188075 A1 | 8/2005 | Dias et al. | |
| 2005/0256946 A1 | 11/2005 | Childress et al. | |
| 2005/0283376 A1* | 12/2005 | Miyoshi et al. | 705/1 |
| 2006/0178918 A1* | 8/2006 | Mikurak | 705/7 |
| 2006/0206619 A1* | 9/2006 | Dan et al. | 709/233 |
| 2006/0293942 A1* | 12/2006 | Chaddha et al. | 705/8 |
| 2007/0027987 A1* | 2/2007 | Tripp et al. | 709/225 |
| 2007/0050492 A1 | 3/2007 | Jorgensen | |
| 2008/0091446 A1* | 4/2008 | Vengerov et al. | 705/1 |
| 2009/0010264 A1 | 1/2009 | Zhang | |
| 2009/0070454 A1 | 3/2009 | McKinnon, III et al. | |
| 2009/0183024 A1 | 7/2009 | Childress et al. | |
| 2009/0187782 A1* | 7/2009 | Greene et al. | 713/340 |
| 2009/0222297 A1* | 9/2009 | Cao et al. | 705/7 |
| 2010/0114531 A1* | 5/2010 | Korn et al. | 702/186 |
| 2010/0283606 A1* | 11/2010 | Tsypin et al. | 340/540 |
| 2010/0286937 A1* | 11/2010 | Hedley et al. | 702/60 |
| 2011/0103374 A1* | 5/2011 | Lajoie et al. | 370/352 |

OTHER PUBLICATIONS

"Dynamic Implementation Switching to Support Service Level Agreements on Demand", May 27, 2004, IPCOM000028699D.

David H.T. Chieng. A Flexible Bandwidth Resource Provisioning System with Agent-Enhanced SLA Negotiation. Journal of High Speed Networks. ISSN-0926-6801 (Print) 1875-8940 (Online). Issue—vol. 13, No. 1/2004. IOS PRESS.

Bala Kalyanasundaram. Unlocking the Advantages of Dynamic Service Selection and Pricing. Theory of Computing Systems, v 38, n 4, 393-410, Jul.-Aug. 2005. ISSN: 1432-4350. Springerlink.

Rahul Garg. A SLA Framework for QoS Provisioning and Dynamic Capacity Allocation. Quality of Service, 2002. Tenth IEEE International Workshop. Publication Date: 2002 on pp. 129-137. ISBN: 0-7803-7426-6. IEEE.

* cited by examiner

| SLA 88 | DYNAMIC EVENT 96 | INFRASTRUCTURE UTILIZATION 98 | EVENT ACTION 100 |
|---|---|---|---|
| CUSTOMER A PREMIUM + | ELECTRICITY CONSTRAINT | HIGH | NO SLA IMPACT |
| CUSTOMER B VARIABLE + | ELECTRICITY CONSTRAINT | HIGH | DEFER SERVICE 4 HRS |
| CUSTOMER C VARIABLE ++ | ELECTRICITY CONSTRAINT | HIGH | REDUCE SLA BY 20% |

FIG. 7

MANAGING SERVICE DEMAND LOAD RELATIVE TO INFRASTRUCTURE CAPACITY IN A NETWORKED COMPUTING ENVIRONMENT

TECHNICAL FIELD

The present invention generally relates to networked computing. Specifically, the present invention relates to managing service demand load relative to infrastructure capacity in a networked (e.g. cloud) computing environment.

BACKGROUND

The cloud computing environment is an enhancement to the predecessor grid environment, whereby multiple grids and other computation resources may be further abstracted by a cloud layer, thus making disparate devices appear to an end-user/consumer as a single pool of seamless resources. These resources may include such things as physical or logical compute engines, servers and devices, device memory, storage devices, etc.

Current systems for managing service demand load relative to infrastructure capacity in a networked (e.g. cloud) computing environment rely on task prioritization, with tasks having a higher priority receiving a relatively greater portion of available resources, and tasks having a lower priority receiving a relatively smaller portion of available resources. These systems do not take into account actual timeliness requirements for consumer initiated workload or tasks, wherein some tasks have critical and/or short term deadlines for completion, and other tasks can be completed over a longer period of time as resources become available at a lower cost. Not taking actual timeliness requirements for the completion of computing workload or tasks into account may require significant capital investment in additional capacity to handle peak demand loads on networked (e.g. cloud) computing systems.

SUMMARY

Embodiments of the present invention provide an approach for implementing service level agreements (SLAs) having variable service delivery requirements and pricing in a networked (e.g. cloud) computing environment. Under embodiments of the present invention, a plurality of SLAs, each having a different price level, is made available to a consumer. The consumer may select one or more of the plurality of SLAs that reflects the consumer's service delivery requirements in a cloud computing environment. A consumer having relatively inflexible service delivery requirements may select one of the SLAs having a relatively higher price, whereas a consumer having relatively flexible service delivery requirements may select one of the SLAs having a relatively lower price. In one embodiment, the SLAs may dynamically provide for relatively lower variable pricing in response to the consumer receiving deferred or a relatively lower level of service during a peak service demand load. In another embodiment, the SLAs may dynamically provide for relatively higher variable pricing in response to consumer service requests that are fulfilled during a relatively higher overall service demand load. In yet another embodiment, the SLAs may dynamically provide for relatively lower variable pricing in response to consumer service requests that occur during a relatively lower overall service demand load.

A first aspect of the present invention provides a computer-implemented method for managing service demand load relative to infrastructure capacity in a networked computing environment, comprising: making a plurality of service level agreements (SLAs) available for selection by a consumer at a computer-based portal, wherein each of the plurality of SLAs comprises a price and an associated level of service; receiving from the consumer via the computer-based portal, a selection of a service level agreement (SLA) from the plurality of SLAs; receiving a consumer service request from the consumer; and executing the consumer service request according to an event action that is taken in response to a dynamic event, the infrastructure utilization relative to infrastructure capacity in the networked computing environment, and the consumer selected SLA.

A second aspect of the present invention provides a computerized system for managing service demand load relative to infrastructure capacity in a networked computing environment, comprising: a bus; a processor coupled to the bus; and a memory medium coupled to the bus, the memory medium comprising instructions to: make a plurality of service level agreements (SLAs) available for selection by a consumer at a computer-based portal, wherein each of the plurality of SLAs comprises a price and an associated level of service; receive from the consumer via the computer-based portal, a selection of a service level agreement (SLA) from the plurality of SLAs; receive a consumer service request from the consumer; and execute the consumer service request according to an event action that is taken in response to a dynamic event, infrastructure utilization relative to infrastructure capacity in the networked computing environment, and the consumer selected SLA.

A third aspect of the present invention provides a computer program product for managing service demand load relative to infrastructure capacity in a networked computing environment, the computer program product comprising a computer readable storage media, and program instructions stored on the computer readable storage media, to: make a plurality of service level agreements (SLAs) available for selection by a consumer at a computer-based portal, wherein each of the plurality of SLAs comprises a price and an associated level of service; receive from the consumer via the computer-based portal, a selection of a service level agreement (SLA) from the plurality of SLAs; receive a consumer service request from the consumer; and execute the consumer service request according to an event action that is taken in response to a dynamic event, infrastructure utilization relative to infrastructure capacity in the networked computing environment, and the consumer selected SLA.

A fourth aspect of the present invention provides a method for deploying a system for managing service demand load relative to infrastructure capacity in a networked computing environment, comprising: deploying a computer infrastructure being operable to: make a plurality of service level agreements (SLAs) available for selection by a consumer at a computer-based portal, wherein each of the plurality of SLAs comprises a price and an associated level of service; receive from the consumer via the computer-based portal, a selection of a service level agreement (SLA) from the plurality of SLAs; receive a consumer service request from the consumer; and execute the consumer service request according to an event action that is taken in response to a dynamic event, infrastructure utilization relative to infrastructure capacity in the networked computing environment, and the consumer selected SLA.

A fifth aspect of the present invention provides a computer-implemented method for managing service demand load relative to infrastructure capacity in a networked computing environment, comprising: making a plurality of service level agreements (SLAs) available for selection by a consumer at a computer-based portal, wherein each of the plurality of SLAs has a price and an associated level of service; receiving from the consumer via the computer-based portal, a selection of a service level agreement (SLA) from the plurality of SLAs; receiving a consumer service request from the consumer; and responsive to infrastructure utilization relative to infrastructure capacity in the networked computing environment and the consumer selected SLA, performing at least one of the following: fully executing the consumer service request; partially executing the consumer service request by restricting infrastructure available to execute the consumer service request; and deferring the consumer service request until infrastructure utilization in the networked computing environment is at or below a predetermined level.

BRIEF DESCRIPTION OF THE DRAWINGS

These and other features of this invention will be more readily understood from the following detailed description of the various aspects of the invention taken in conjunction with the accompanying drawings in which:

FIG. 7 depicts a table of SLAs having defined rules according to an embodiment of the present invention.

Figure 1:
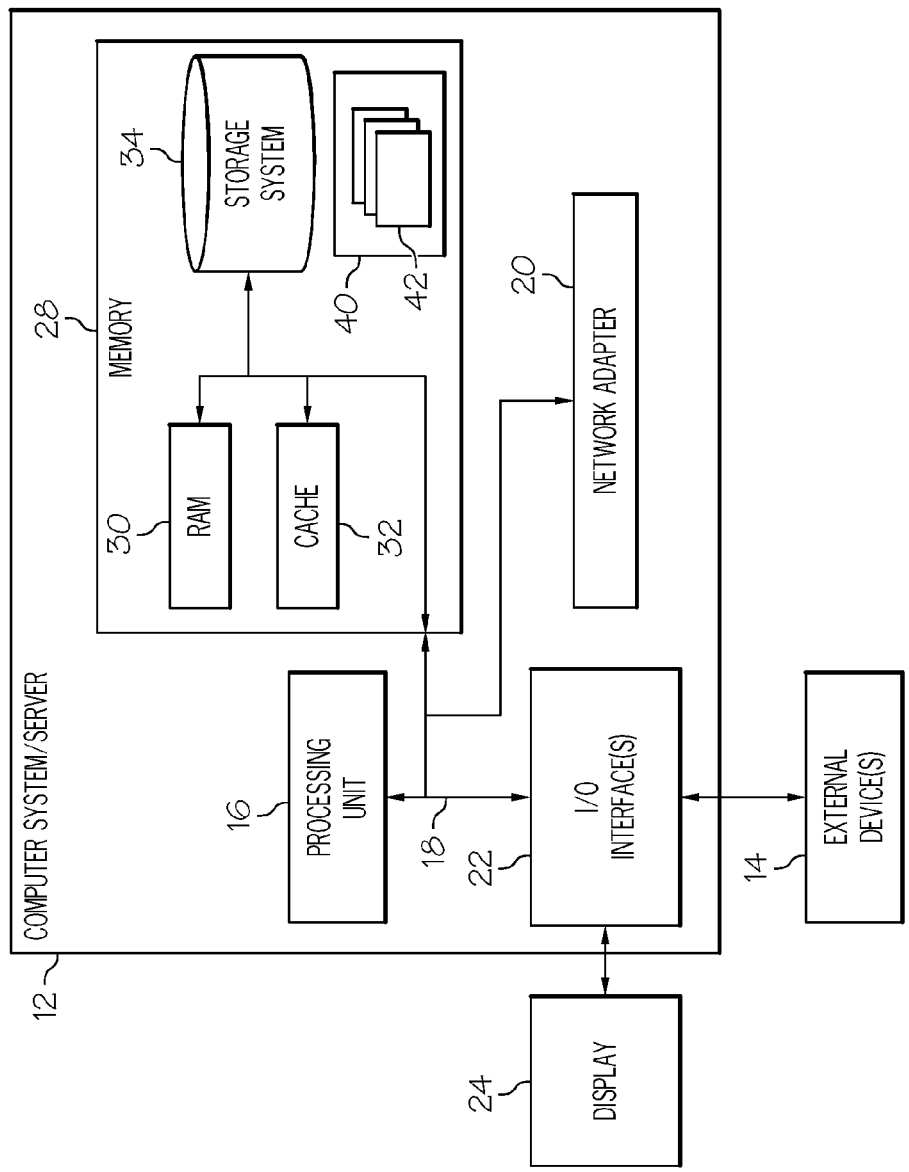
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Exemplary embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for implementing service level agreements (SLAs) having variable service delivery requirements and pricing in a cloud computing environment. Under embodiments of the present invention, a plurality of SLAs, each having a different price level, is made available to a consumer. The consumer may select one or more of the plurality of SLAs that reflects the consumer's service delivery requirements in a cloud computing environment. A consumer having relatively inflexible service delivery requirements may select one of the SLAs having a relatively higher price, whereas a consumer having relatively flexible service delivery requirements may select one of the SLAs having a relatively lower price. In one embodiment, the SLAs may dynamically provide for relatively lower variable pricing in response to the consumer receiving deferred or a relatively lower level of service during a peak service demand load. In another embodiment, the SLAs may dynamically provide for relatively higher variable pricing in response to consumer service requests that are fulfilled during a relatively higher overall service demand load. In yet another embodiment, the SLAs may dynamically provide for relatively lower variable pricing in response to consumer service requests that occur during a relatively lower overall service demand load.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including computer readable storage devices. Computer readable storage devices herein comprise all computer readable media, with the sole exception being a transitory, propagating signal.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user/consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
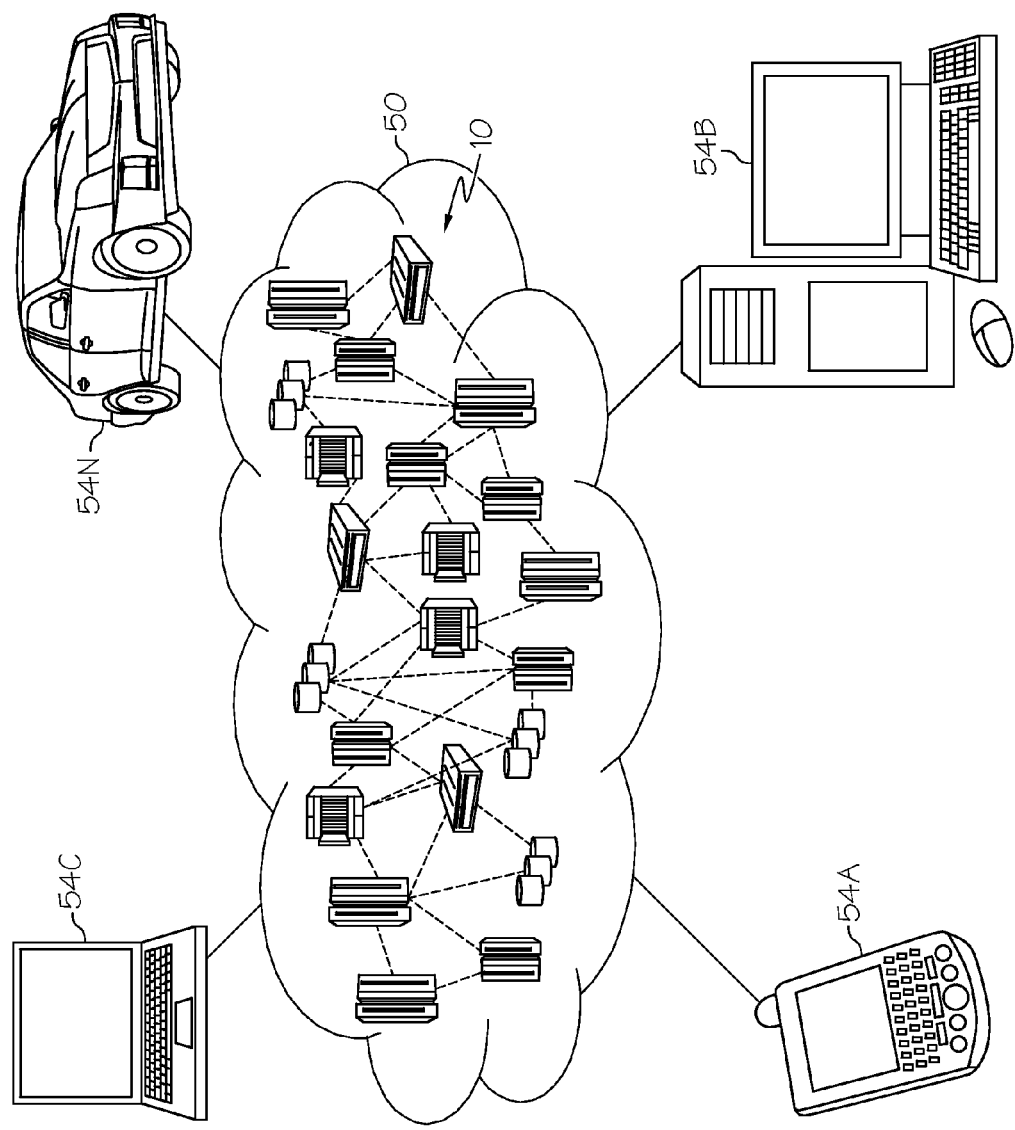
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
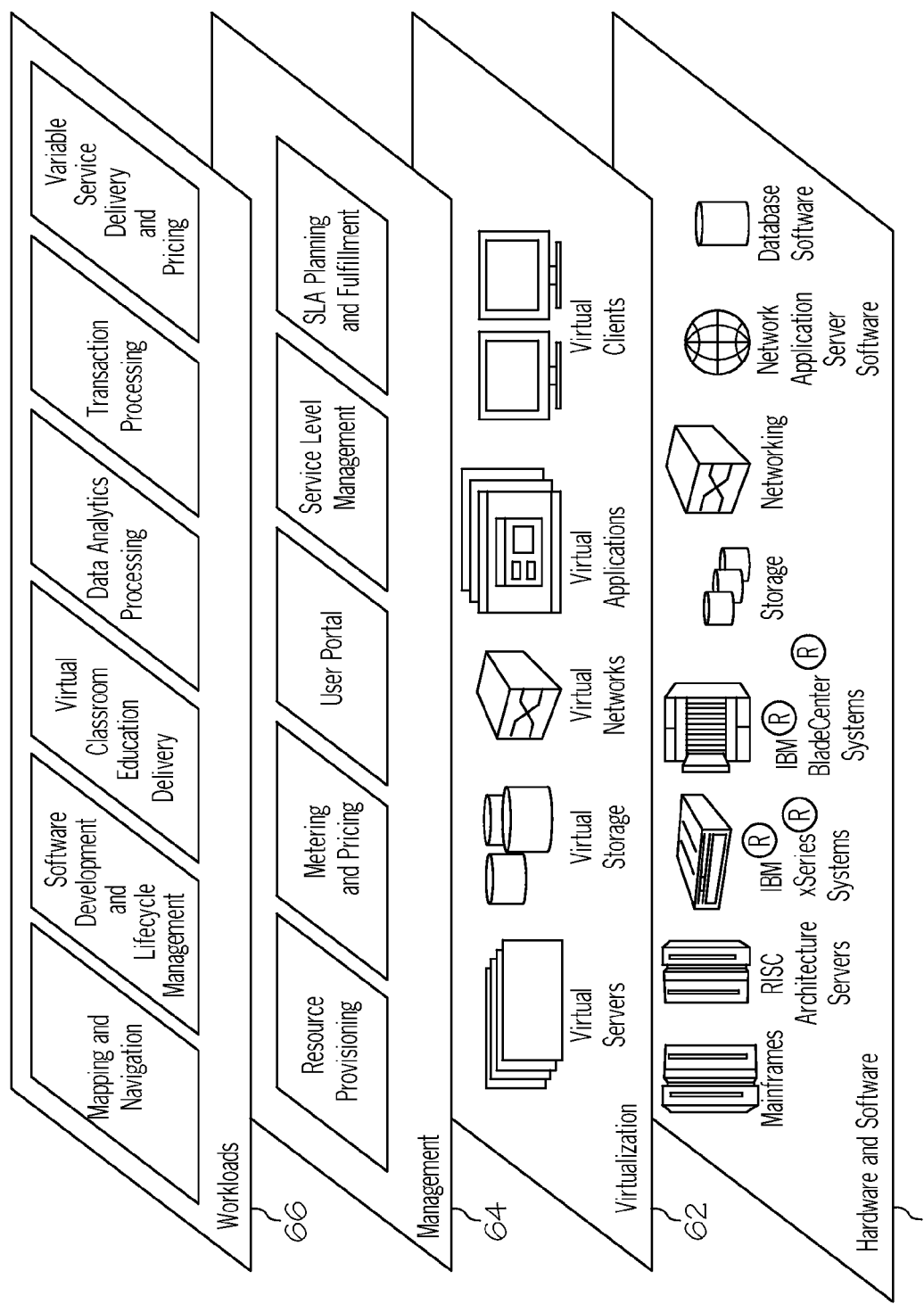
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User/consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and variable service delivery and pricing. As mentioned above, all of the foregoing examples described with respect to FIG. 3 are illustrative only, and the invention is not limited to these examples.

It is understood that functions of the present invention as described herein may be performed by the variable service delivery and pricing, which can be tangibly embodied as modules of program code 42 of program/utility 40 (shown in FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
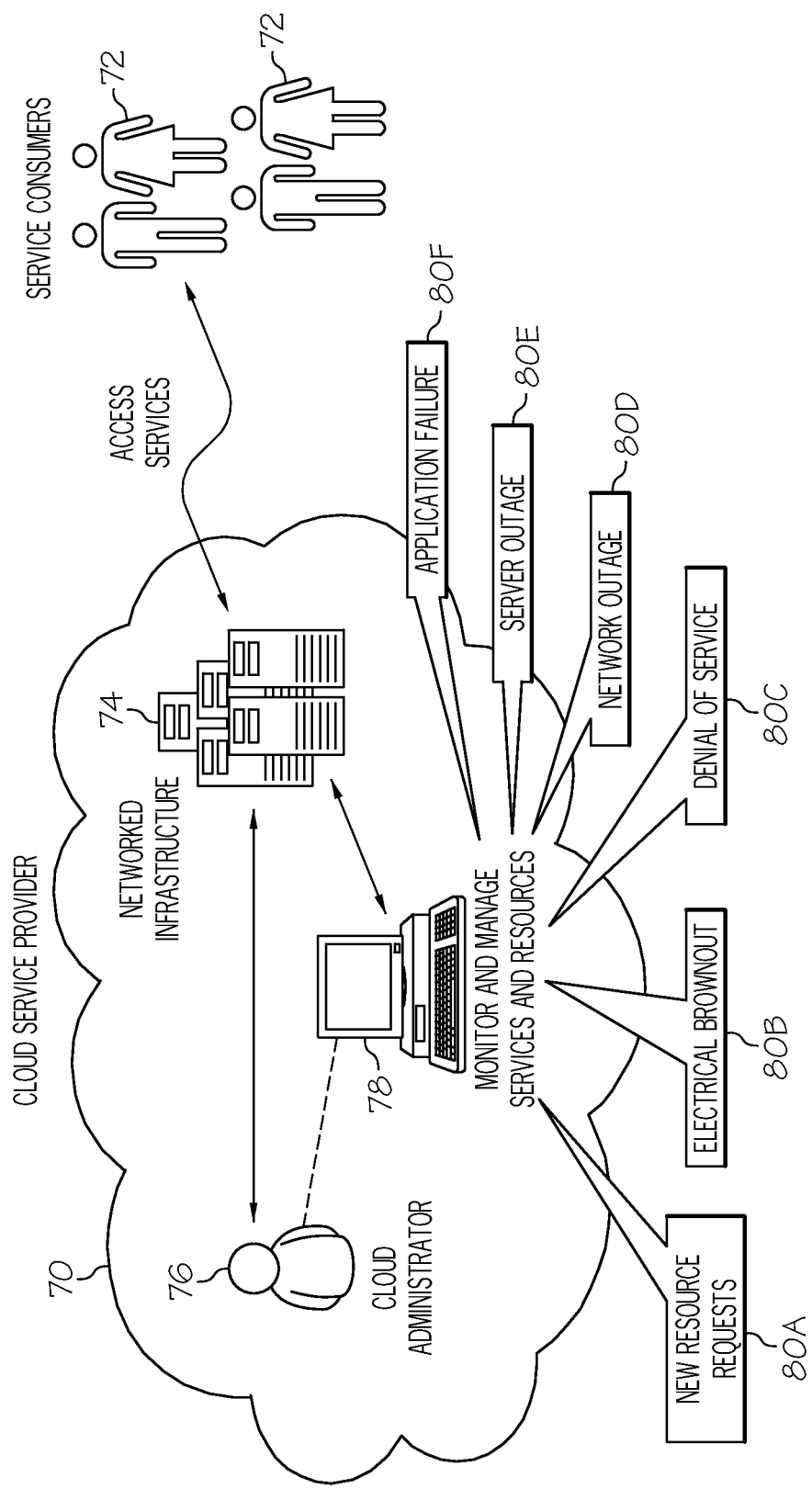
FIG. 4 depicts a network computing environment managing service delivery challenges according to an embodiment of the present invention.

Referring now to FIG. 4, infrastructure 70 of a typical cloud service provider with service consumers 72 accessing the provider's services according to an embodiment of the present invention is shown. As depicted, infrastructure 70 may be susceptible to various types of potential service interruption events. In general, service consumers 72 access services provided by a cloud service provider utilizing a network (e.g. a TCP/IP based network such as the Internet). In one embodiment, the services provided by the cloud service provider are implemented on networked infrastructure 74, comprising networks, servers, memory, storage, applications, virtual machines, and other computing and network devices as described hereinabove with reference to FIGS. 1-3. Cloud administrator 76 may monitor and manage services and resources implemented via networked infrastructure 74 utilizing computer-based portal 78, in one example a web browser running on a network-attached client system. Cloud administrator 76 may also access networked infrastructure 74 using other network attached devices, or using consoles, or the like, that are locally attached (i.e. directly connected) to the devices which comprise networked infrastructure 74.

Potential service interruption events 80A-F that can occur dynamically and unexpectedly, and which may have a significant influence upon the availability of a cloud service provider's resources, are also depicted in FIG. 4. Potential service interruption events 80A-F may comprise events which typically occur in a networked computer infrastructure such as an application failure or a network outage, or an atypical event such as electrical power brown-out or outage, and are described hereinbelow. New resource requests 80A comprise additional tasks or requests for service for which a cloud service provider does not immediately have sufficient resources to fulfill. Electrical brownout 80B comprises an electrical power constraint or an outage of an electrical power grid due to grid overload, grid infrastructure (e.g. transformer) failure, catastrophic weather or geologic events, accidents, fire, sabotage or public unrest, solar magnetic storms, or the like. Denial of service 80C comprises denial of service attacks such that spurious requests for service are made by a third party perpetrator so as to deny timely service to legitimate consumers. Denial of service 80C may also occur because of an authentication failure, e.g. access to a secure database or a licensed application is denied because of incorrect or outdated access credentials. Network outage 80D comprises a significant drop in the level of throughput or available bandwidth of a network, or a complete stoppage of network traffic. Network outage 80D may be caused by circumstances similar to those which can cause electrical brownout 80B above, such as network overload, network infrastructure (e.g. router or switch) failure, catastrophic weather or geologic events, accidents, fire, sabotage or public unrest, solar magnetic storms, or the like. Server outage 80E may comprise a hardware or software failure in a computer server device. Server outage 80E may be caused by, for example, electronics failure in an integrated circuit, discrete component, or a card or board onto which the foregoing are mounted. Server outage 80E may further be caused by an abnormal software termination or exit in a server's firmware or operating system. Application failure 80F may comprise an abnormal software termination or exit in a mission-critical software application such as WebSphere application server software or DB2 database software. The above examples of potential service interruption events are intended to be illustrative only, and these examples are not intended to be all-inclusive.

Figure 5:
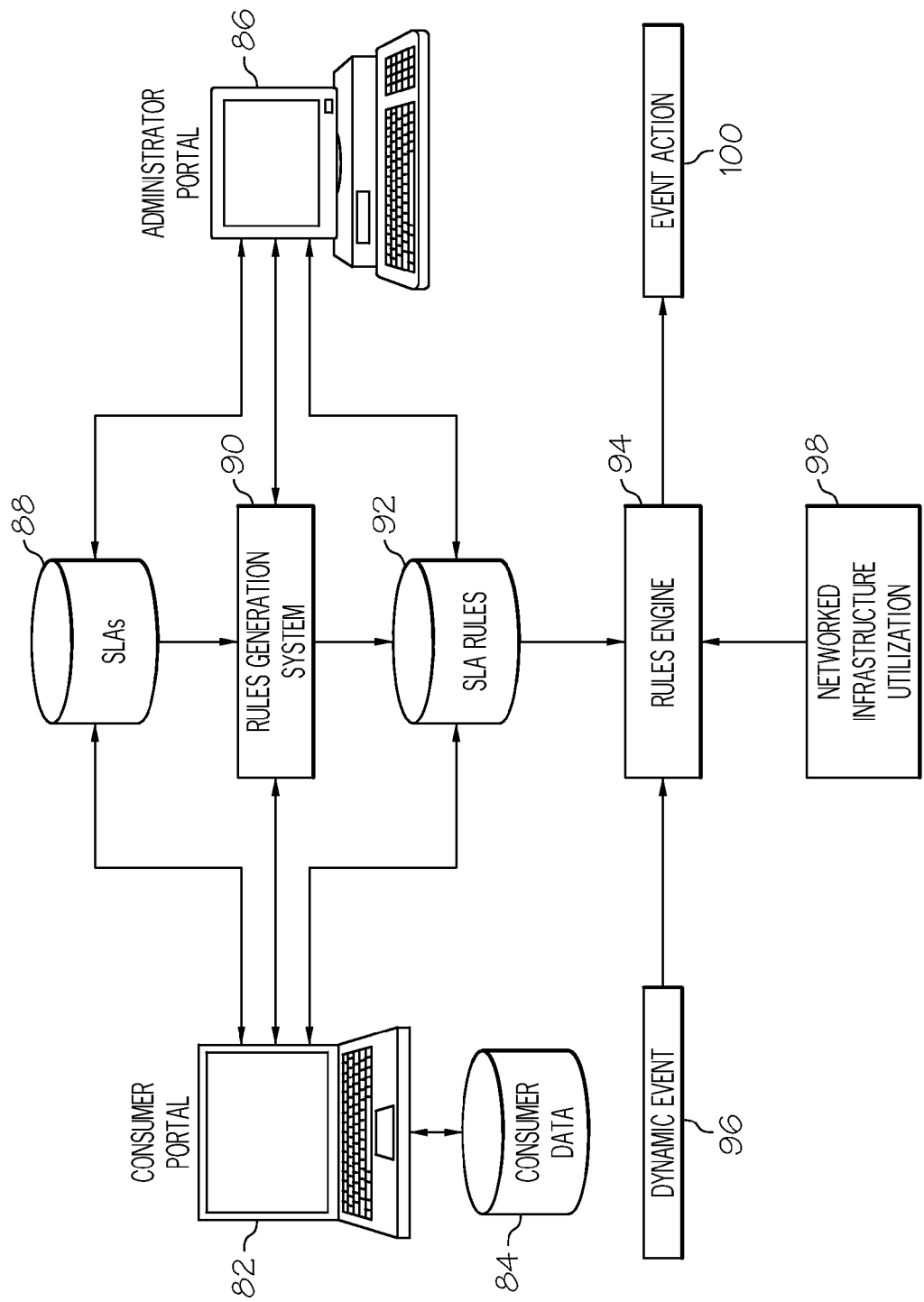
FIG. 5 depicts a service demand load management system according to an embodiment of the present invention.

Referring now to FIG. 5, a system for managing service demand load relative to infrastructure capacity in a networked computing environment through variable service delivery and pricing according to an embodiment of the present invention is shown. Consumer 72 (shown in FIG. 4) utilizes computer-based consumer portal 82 to access a plurality of service level agreements (SLAs) 88 that are contained in a database or data structure, and which are available for the consumer to select. A database or data structure contains consumer data 84 which comprises administrative consumer information such as consumer userid, password, user profile, etc. Consumer data 84 also comprises SLAs which the consumer has previously selected as well as attributes of those SLAs, such as the price and associated level of service for each of the SLAs. The consumer selected SLA also comprises a dynamic event, and an event action to be taken in response to the dynamic event. A dynamic event is an event in which an additional workload is placed on computing infrastructure, or a failure of computing or supporting (e.g. electrical power grid) infrastructure occurs such that meeting one or more SLAs is placed in jeopardy. By way of example, a dynamic event may comprise potential service interruption events 80A-F described hereinabove with reference to FIG. 4.

An event action is an action taken to mitigate the possible deleterious effects of a dynamic event such that impacts to consumers are minimized, preferably only to an extent that is specified in an SLA to which a consumer has previously agreed. By way of example, event actions may comprise: reallocating or marshaling resources such that there is no impact to a consumer, reducing resources available to a consumer or task by a predetermined amount, reprioritizing a consumer service request or task, deferring a consumer service request or task for a predetermined period of time, or reducing the price or service rate the consumer is charged by a predetermined amount.

Cloud administrator 76 (shown in FIG. 4) utilizes computer-based administrator portal 86 to define the plurality of SLAs 88 that are available for selection by consumer 72. Each of the plurality of SLAs 88 comprises at least the following metadata:

<Pricing Level 1..J>
<SLA Level 1..K>
<Dynamic Event 1..L>
<Infrastructure Utilization 1..M>
<Event Action 1..N>

Consumer 72 utilizes computer-based consumer portal 82 to select a service level agreement (SLA) from the plurality of SLAs 88. When a selection of an SLA is received from the consumer, rules generation system 90 creates and encodes one or more SLA rules 92 for the SLA that was selected by the consumer. Along these lines, if more than one SLA is selected by the consumer, one or more SLA rules 92 are created and encoded for each SLA that is selected. Cloud administrator 76 utilizes computer-based administrator portal 86 to specify how rules generation system 90 creates and encodes the one or more SLA rules 92 that are respectively associated with each selected SLA of the plurality of SLAs 88. SLA rules 92 are stored and/or contained in a database or data structure. An example of a rule comprising SLA rules 92 is shown below, wherein "A", "B", "C", Dynamic Event, and Event Action are specified by the consumer:

IF <Pricing Level> IS <"A"> AND <SLA Level> IS <"B"> AND <Dynamic Event> OCCURS AND <Infrastructure Utilization> IS <"C"> THEN PERFORM <Event Action>

From time to time, consumer 72 may utilize computer-based consumer portal 82, or some other portal, system, or method to submit a consumer service request. When the consumer service request is received, the request is executed according to an event action 100 that is taken in response to a dynamic event 96, networked infrastructure utilization 98 relative to the total infrastructure capacity in the networked computing environment, and the one or more rules of SLA rules 92 that are based on the consumer selected SLA of the plurality of SLAs 88. In other words, when a dynamic event 96 occurs, rules engine 94 utilizes one or more rules of SLA rules 92 and networked infrastructure utilization 98 to determine a specific event action 100. As was previously mentioned, dynamic event 96 may comprise potential service interruption events 80A-F described hereinabove with reference to FIG. 4. Examples of event action 100 are described hereinabove with reference to FIG. 5.

Networked infrastructure utilization 98 may comprise: CPU and memory utilization in compute nodes, available storage and storage latency in storage nodes, network bandwidth that is available as compared with total network capacity, and other known measurements of networked computing infrastructure capacity and utilization. Networked infrastructure utilization 98 is the instantaneous utilization of the networked infrastructure measured against the total capacity of the networked infrastructure, whereas service demand load comprises a networked infrastructure utilization trend or trends. In other words, service demand load comprises the slope of the curve of a series of periodic networked infrastructure utilization measurements taken over a given period of time.

Figure 6:
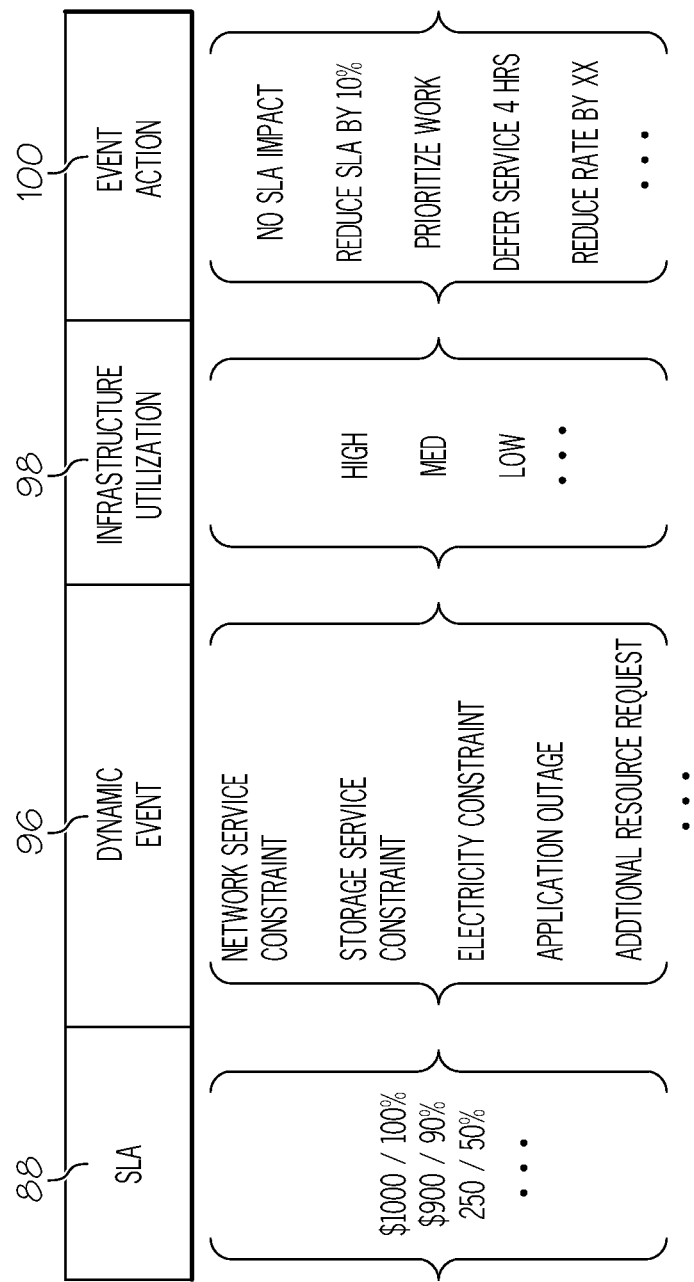
FIG. 6 depicts an SLA option selection table according to an embodiment of the present invention.

Referring now to FIG. 6, an SLA option selection table according to an embodiment of the present invention is shown. This table depicts various options that a consumer may choose when selecting an SLA. The combinations of options from which the consumer may choose are determined and defined by Cloud administrator 76 (shown in FIG. 4). A plurality of SLAs 88 is shown, each SLA having a price and associated level of service. For example, by selecting an SLA having a cost or subscription rate of $1,000 per month, the consumer is contracting for 100% infrastructure availability. For a cost or subscription rate of $250 per month, however, the consumer is contracting for only 50% infrastructure availability. Various dynamic events 96 are shown for which the consumer may specify handling through a particular event action 100 or a combination of event actions. Various levels of infrastructure utilization 98 are shown such that the consumer may specify different event actions depending upon utilization when a dynamic event occurs. Although examples of infrastructure utilization 98 are depicted as HIGH, MED, or LOW, more granular (e.g. specific utilization percentages) or coarser (e.g. >50%) utilization levels may also be defined in an SLA. FIG. 6 is illustrative only, and additional SLA characteristics, as well as other combinations of SLA characteristics than those depicted are certainly possible.

Referring now to FIG. 7, a table of SLAs having defined rules according to an embodiment of the present invention is shown. This table depicts SLAs 88 that have selected, and for which options have been chosen by a consumer. One or more SLA rules 92 (shown in FIG. 5) have been created and encoded by rules generation system 90 (shown in FIG. 5) for each of the SLAs 88. A consumer known as CUSTOMER A has selected a PREMIUM+SLA having a relatively higher price or subscription rate which will provide for the reallocation of resources such that there is no impact to CUSTOMER A, even when infrastructure utilization 98 is HIGH, and dynamic event 96, ELECTRICITY CONSTRAINT, occurs. A consumer known as CUSTOMER B has selected a VARIABLE+SLA having a relatively lower price or subscription rate which will cause a service request of CUSTOMER B to be deferred by 4 hours when infrastructure utilization 98 is HIGH, and dynamic event 96, ELECTRICITY CONSTRAINT, occurs. A consumer known as CUSTOMER C has selected a VARIABLE++SLA having a medium level price or subscription rate which will cause a service request of CUSTOMER C to receive 20% less networked infrastructure resources when infrastructure utilization 98 is HIGH, and dynamic event 96, ELECTRICITY CONSTRAINT, occurs. FIG. 7 is illustrative only, and SLAs having different options and characteristics, as well as other combinations of SLA options and characteristics than those depicted are certainly possible.

Figure 8:
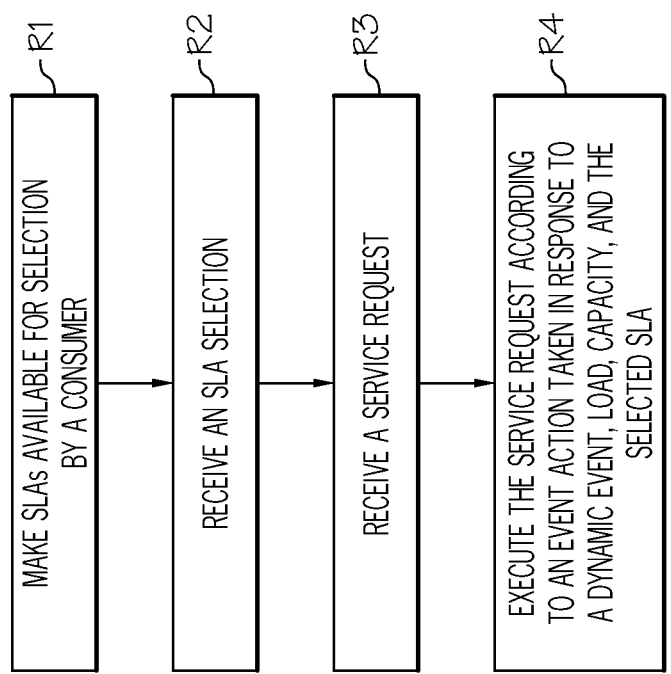
FIG. 8 depicts a method flow diagram according to an embodiment of the present invention.

Referring now to FIG. 8, a method flow diagram according to the present invention is shown. As depicted in step R1, a plurality of service level agreements (SLAs) is made available for selection by a consumer at a computer-based portal. Each of the plurality of SLAs comprises a price and an associated level of service. In step R2, a selection of a service level agreement (SLA) from the plurality of SLAs is received from the consumer via the computer-based portal. In step R3, a consumer service request is received from the consumer. In step R4, the consumer service request is executed according to an event action that is taken in response to: a dynamic event, infrastructure utilization relative to infrastructure capacity in the networked computing environment, and the consumer selected SLA.

Figure 9:
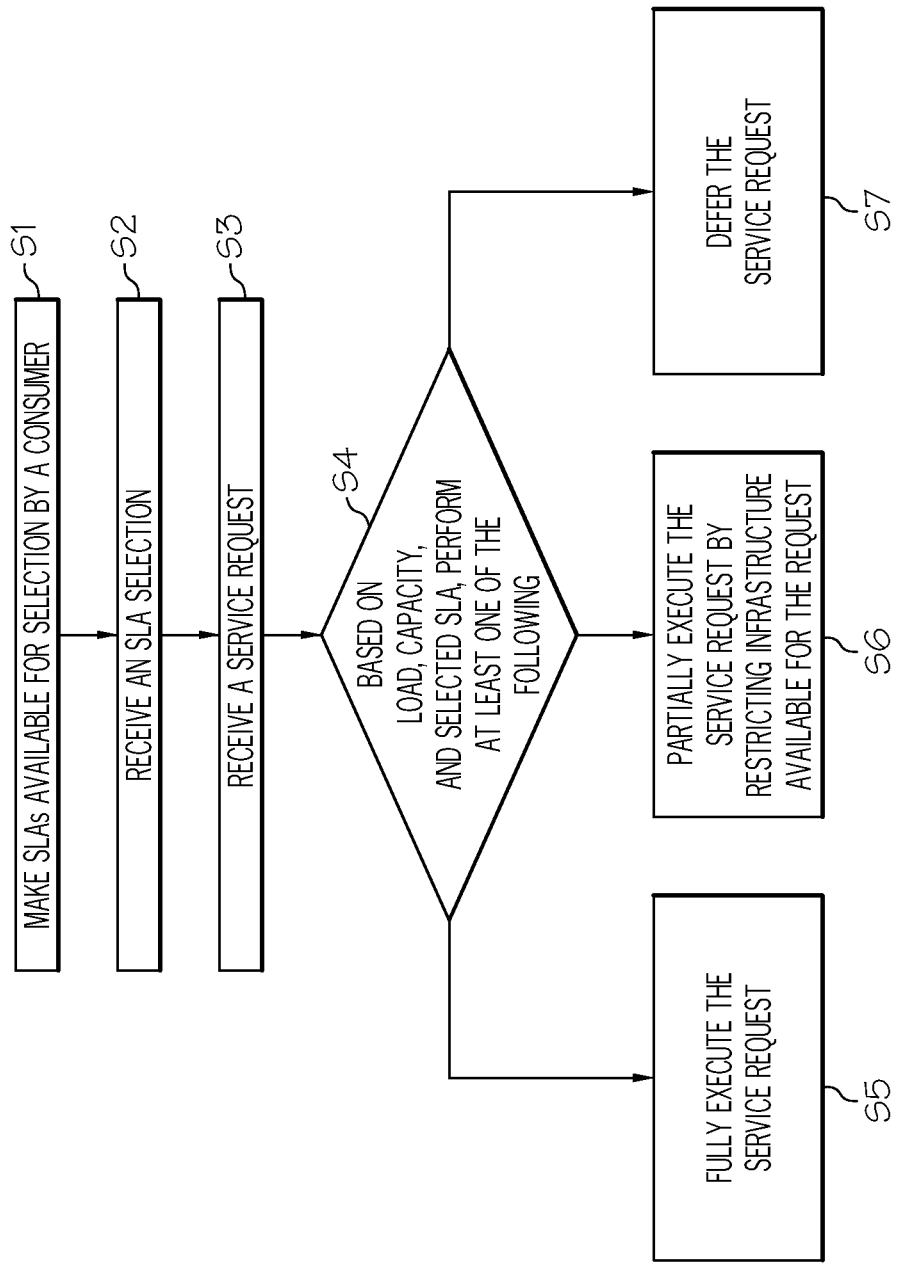
FIG. 9 depicts a method flow diagram according to an embodiment of the present invention.

Referring now to FIG. 9, a method flow diagram according to the present invention is shown. As depicted in step S1, a plurality of service level agreements (SLAs) is made available for selection by a consumer at a computer-based portal. Each of the plurality of SLAs comprises a price and an associated level of service. In step S2, a selection of a service level agreement (SLA) from the plurality of SLAs is received from the consumer via the computer-based portal. In step S3, a consumer service request is received from the consumer. In step S4, a decision is made as to how to handle the consumer service request based upon infrastructure utilization relative to the infrastructure capacity in the networked computing environment and the SLA the consumer selected, such that at least one of the following is performed: fully executing the consumer service request as shown in step S5, partially executing the consumer service request by restricting infrastructure available to execute the consumer service request as shown in step S6, and deferring the consumer service request until infrastructure utilization in the networked computing environment is at or below a predetermined level as shown in step S7.

While shown and described herein as a solution for managing service demand load relative to infrastructure capacity in a networked computing environment through variable service delivery and pricing, it is understood that the invention further provides various alternative embodiments. For example, in one embodiment, the invention provides a computer-readable/useable medium that includes computer program code to enable a computer infrastructure to provide functionality for managing service demand load relative to infrastructure capacity in a networked computing environment through variable service delivery and pricing as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide functionality for managing service demand load relative to infrastructure capacity in a networked computing environment through variable service delivery and pricing. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for managing service demand load relative to infrastructure capacity in a networked computing environment through variable service delivery and pricing. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for managing service demand load relative to infrastructure capacity in a networked computing environment, comprising:
   receiving, by a computer processor, from a consumer, a selection of a selected service level agreement (SLA), which sets a default service level and a default price; and
   managing, by the computer processor, a service load of a networked computing environment by:
      generating, by the computer processor, a modified SLA by adjusting the default price to an adjusted price based, at least in part, upon the selected SLA and at least one of the following: (i) a dynamic event that has occurred in the networked computing environment, and (ii) infrastructure utilization relative to infrastructure capacity in the networked computing environment; and
      allocating, by the computer processor, a portion of at least one computing resource included in the networked computing environment to the consumer based, at least in part, on the modified SLA.

2. The method of claim 1, wherein the dynamic event comprises at least one of the following: a new request for a computing resource, an electrical power constraint, an electrical brownout, a denial of service, a network outage, a server outage, a storage outage, and an application failure.

3. The method of claim 1, wherein the selected SLA further comprises a dynamic event and an event action to be taken in response to the dynamic event, and wherein the selected SLA is encoded as an SLA rule and a specific event action is determined based upon the dynamic event, the SLA rule, and infrastructure utilization relative to the infrastructure capacity.

4. A computer program product for managing service demand load relative to infrastructure capacity in a networked computing environment, the computer program product comprising a non-transitory computer readable storage device, and program instructions stored on the non-transitory computer readable storage device, the program instructions comprising:
   program instructions to receive from the consumer, a selection of a selected service level agreement (SLA), which sets a default service level and a default price; and
   program instructions to manage a service load of the networked computing environment by generating a modified SLA by:

adjusting the default price to an adjusted price based, at least in part, upon the selected SLA and at least one of the following: (i) a dynamic event that has occurred in the networked computing environment, and (ii) infrastructure utilization relative to infrastructure capacity in the networked computing environment: and allocating a portion of at least one computing resource included in the networked computing environment to the consumer based, at least in part, on the modified SLA.

5. The computer program product of claim 4, wherein the dynamic event comprises at least one of the following: a new request for a computing resource, an electrical power constraint, an electrical brownout, a denial of service, a network outage, a server outage, a storage outage, and an application failure.

6. The computer program product of claim 4, wherein the selected SLA further comprises a dynamic event and an event action to be taken in response to the dynamic event, and wherein the selected SLA is encoded as an SLA rule and a specific event action is determined based upon the dynamic event, the SLA rule, and infrastructure utilization relative to the infrastructure capacity.

7. The method of claim 1, wherein adjustment of the default price to the adjusted price is based, at least in part, upon both of the following: (i) the dynamic event in the networked computing environment, and (ii) infrastructure utilization relative to infrastructure capacity in the networked computing environment.

8. The computer program product of claim 4, wherein adjustment of the default price to the adjusted price is based, at least in part, upon both of the following: (i) the dynamic event in the networked computing environment, and (ii) infrastructure utilization relative to infrastructure capacity in the networked computing environment.

9. A computerized system for managing service demand load relative to infrastructure capacity in a networked computing environment, comprising:
a bus;
a processor coupled to the bus; and
a computer readable storage device coupled to the bus, the computer readable storage device comprising program instructions, the program instructions comprising:
program instructions to receive from the consumer, a selection of a selected service level agreement (SLA), which sets a default service level and a default price; and
program instructions to manage a service load of the networked computing environment by generating a modified SLA by:
adjusting the default price to an adjusted price based, at least in part, upon the selected SLA and at least one of the following: (i) a dynamic event that has occurred in the networked computing environment, and (ii) infrastructure utilization relative to infrastructure capacity in the networked computing environment; and
allocating, by the computer processor, a portion of at least one computing resource included in the networked computing environment to the consumer based, at least in part, on the modified SLA.

10. The computerized system of claim 9, wherein the dynamic event comprises at least one of the following: a new request for a computing resource, an electrical power constraint, an electrical brownout, a denial of service, a network outage, a server outage, a storage outage, and an application failure.

11. The computerized system of claim 9, wherein the selected SLA further comprises a dynamic event and an event action to be taken in response to the dynamic event, and wherein the selected SLA is encoded as an SLA rule and a specific event action is determined based upon the dynamic event, the SLA rule, and infrastructure utilization relative to the infrastructure capacity.

12. The computerized system of claim 11, wherein the event action comprises at least one of the following: reallocating resources such that there is no impact to the consumer, reducing available resources by a predetermined amount, reprioritizing the consumer service request, deferring the consumer service request for a predetermined period of time, and reducing the rate the consumer is charged by a predetermined amount.

13. The computerized system of claim 9 wherein adjustment of the default price to the adjusted price is based, at least in part, upon both of the following: (i) the dynamic event in the networked computing environment, and (ii) infrastructure utilization relative to infrastructure capacity in the networked computing environment.

14. A method for managing service demand load relative to infrastructure capacity in a networked computing environment, comprising:
receiving, by a computer processor, from a consumer, a selection of a selected service level agreement (SLA), which sets a default service level and a default price; and
managing a service load of the networked computing environment by generating a modified SLA by:
adjusting, by the computer processor, the default service level to an adjusted service level based, at least in part, upon the selected SLA and at least one of the following: (i) a dynamic event that has occurred in the networked computing environment, and (ii) infrastructure utilization relative to infrastructure capacity in the networked computing environment; and
allocating, by the computer processor, a portion of at least one computing resource included in the networked computing environment to the consumer based, at least in part, on the modified SLA.

15. The computerized system of claim 13, wherein the dynamic event comprises at least one of the following: a new request for a computing resource, an electrical power constraint, an electrical brownout, a denial of service, a network outage, a server outage, a storage outage, and an application failure.

16. The method of claim 14, wherein the selected SLA further comprises a dynamic event and an event action to be taken in response to the dynamic event, and wherein the selected SLA is encoded as an SLA rule and a specific event action is determined based upon the dynamic event, the SLA rule, and infrastructure utilization relative to the infrastructure capacity.

17. The method of claim 16, wherein the event action comprises at least one of the following: reallocating resources such that there is no impact to the consumer, reducing available resources by a predetermined amount, reprioritizing the consumer service request, deferring the consumer service request for a predetermined period of time, and reducing the rate the consumer is charged by a predetermined amount.

18. The method of claim 14, the method further comprising:
adjusting the default price to an adjusted price based, at least in part, upon both of the following: (i) the dynamic event in the networked computing environment, and (ii) infrastructure utilization relative to infrastructure capacity in the networked computing environment.

19. A computer program product for managing service demand load relative to infrastructure capacity in a networked computing environment, the computer program product comprising a non-transitory computer readable storage device, and program instructions stored on the non-transitory computer readable storage device, the program instructions comprising:

program instructions to receive from the consumer, a selection of a selected service level agreement (SLA), which sets a default service level and a default price; and program instructions to manage a service load of the networked computing environment by:

generating a modified SLA by adjusting the default service level to an adjusted service level based, at least in part, upon the-selected SLA and at least one of the following: (i) a dynamic event that has occurred in the networked computing environment, and (ii) infrastructure utilization relative to infrastructure capacity in the networked computing environment; and allocating, by the computer processor, a portion of at least one computing resource included in the networked computing environment to the consumer based, at least in part, on the modified SLA.

20. The computer program product of claim 14, wherein the dynamic event comprises at least one of the following: a new request for a computing resource, an electrical power constraint, an electrical brownout, a denial of service, a network outage, a server outage, a storage outage, and an application failure.

21. The method of claim 14 wherein adjustment of the default price to the adjusted price is based, at least in part, upon both of the following: (i) the dynamic event in the networked computing environment, and (ii) infrastructure utilization relative to infrastructure capacity in the networked computing environment.

22. The method of claim 3, wherein the event action comprises at least one of the following: reallocating resources such that there is no impact to the consumer, reducing available resources by a predetermined amount, reprioritizing the consumer service request, deferring the consumer service request for a predetermined period of time, and reducing the rate the consumer is charged by a predetermined amount.

23. The computer program product of claim 6, wherein the event action comprises at least one of the following: reallocating resources such that there is no impact to the consumer, reducing available resources by a predetermined amount, reprioritizing the consumer service request, deferring the consumer service request for a predetermined period of time, and reducing the rate the consumer is charged by a predetermined amount.

* * * * *